US009725060B1

(12) United States Patent
Daniel et al.

(10) Patent No.: US 9,725,060 B1
(45) Date of Patent: Aug. 8, 2017

(54) REDUCING SURFACE RIGIDITY OF A VEHICLE

(71) Applicant: Waymo LLC, Mountain View, CA (US)

(72) Inventors: Thomas Daniel, San Francisco, CA (US); Daniel Lynn Larner, San Jose, CA (US); Felix Jose Alvarez Rivera, Tarzana, CA (US); Atul Gupta, San Jose, CA (US)

(73) Assignee: Waymo LLC, Mountain View, CA (US)

(*) Notice: Subject to any disclaimer, the term of this patent is extended or adjusted under 35 U.S.C. 154(b) by 0 days.

(21) Appl. No.: 14/844,607

(22) Filed: Sep. 3, 2015

(51) Int. Cl.
B60R 19/02 (2006.01)
B60R 21/34 (2011.01)
B60R 21/0134 (2006.01)
B60R 19/00 (2006.01)

(52) U.S. Cl.
CPC .......... *B60R 21/0134* (2013.01); *B60R 19/02* (2013.01); *B60R 21/34* (2013.01); *B60R 2019/007* (2013.01); *B60R 2021/343* (2013.01)

(58) Field of Classification Search
CPC ..... B60R 19/02; B60R 21/0134; B60R 21/34; B60R 2019/007; B60R 2021/343
USPC ......................................................... 701/45
See application file for complete search history.

(56) References Cited

U.S. PATENT DOCUMENTS

| 1,539,873 | A | 6/1925 | Schiesari |
| 1,701,308 | A | 2/1929 | Rosenberg |
| 3,614,148 | A | 10/1971 | Favary |
| 4,616,866 | A | 10/1986 | Loren et al. |
| 7,669,685 | B2* | 3/2010 | Takahashi ........... B60R 21/0134 180/271 |
| 2006/0060408 | A1* | 3/2006 | Kalliske .................. B60R 21/38 180/274 |
| 2006/0103061 | A1* | 5/2006 | Kennedy ................. C08G 18/10 267/116 |
| 2006/0232051 | A1* | 10/2006 | Morris .................... B60R 21/02 280/732 |
| 2009/0056230 | A1* | 3/2009 | Flendrig ................ B60J 5/0405 49/502 |
| 2009/0206618 | A1* | 8/2009 | Ralston ................... B60R 19/18 293/120 |
| 2010/0244484 | A1* | 9/2010 | Nakaura ................. B60R 21/38 296/187.04 |
| 2011/0091273 | A1* | 4/2011 | Sayre ..................... C08G 18/10 404/6 |
| 2011/0210579 | A1* | 9/2011 | Marur ................ B60N 2/42709 296/187.03 |
| 2012/0073884 | A1* | 3/2012 | Guthrie .................. B60G 11/00 177/225 |
| 2012/0125699 | A1* | 5/2012 | Guthrie ................. B60G 11/00 177/225 |

(Continued)

*Primary Examiner* — Atul Trivedi
(74) *Attorney, Agent, or Firm* — Lerner, David, Littenberg, Krumholz & Mentlik, LLP

(57) ABSTRACT

Aspects of the disclosure relate altering the rigidity of a vehicle's surface. More particularly, the vehicle may contain tension members that are arranged so that a change in tension across one or more of the tension members will alter the rigidity of the vehicle's surface. The vehicle may identify and respond to a potential collision by altering the tension that is applied to one or more tension members, thereby altering the rigidity of the vehicle's surface.

20 Claims, 9 Drawing Sheets

(56) References Cited

U.S. PATENT DOCUMENTS

2014/0183957 A1* 7/2014 Duchesneau ......... F01K 13/006
                                                            307/64
2014/0306482 A1* 10/2014 Corwin .................. B60R 19/12
                                                            296/180.1

* cited by examiner

REDUCING SURFACE RIGIDITY OF A VEHICLE

BACKGROUND

Collisions involving at least one vehicle occur frequently and often cause serious harm. The force of the vehicle's impact is a primary factor in the amount of damage that is caused by the vehicle. Accordingly, it is desirable to design a vehicle that can reduce the force of impact experienced during a collision.

BRIEF SUMMARY

One aspect of the disclosure provides a system and method for altering a vehicle's rigidity. The system and method may include detecting, by one or more sensors, an object in a vehicle's surroundings; determining, by one or more processors, that the object and the vehicle will collide; and altering, by the one or more processors, a tension in one or more tension members based on the determination that the object and the vehicle will collide, wherein altering the tension of the one or more tension members alters a rigidity of a portion of the vehicle.

In another aspect, the tension members may be cables, and the tension of the cables may be reduced by one of cutting, releasing, or loosening the cables. In addition, the one or more tension members may be arranged with respect to a surface of the vehicle so that a reduction of tension in the one or more tension members reduces rigidity of the surface. The surface of the vehicle may be at least one of a hood, bumper, or panel. A portion of the surface may be corrugated.

In another aspect, the one or more tension members may be arranged with respect to a pillar of the vehicle so that reduction of tension in the one or more tension members reduces rigidity of the pillar. In addition, the pillar may include a plurality of sections, and wherein a sufficient tension within the one or more tension members prevents the plurality of sections from moving relative to one another.

In another aspect, detecting the object may further include classifying the object, and altering the tension in the one or more tension members may be based, at least in part, on a classification of the object. The classification of the object may be one of a bicyclist, pedestrian, or animal.

DETAILED DESCRIPTION

Overview

Figure 1:
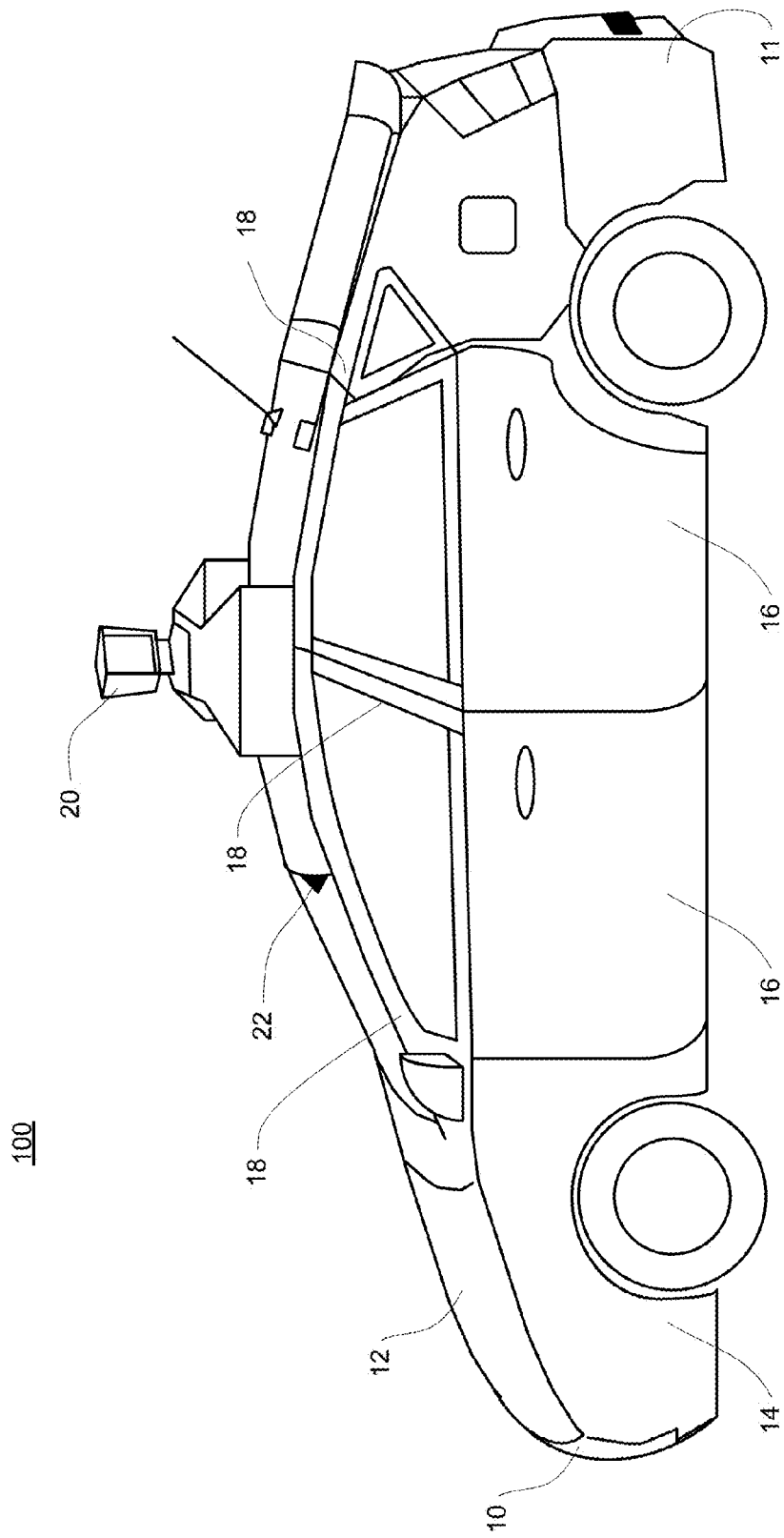
FIG. 1 is an exterior of a vehicle in accordance with aspects of the disclosure.

Aspects of the disclosure relate to altering the rigidity of a vehicles surface in response to a potential collision with another object. As an example, cables may be mounted to the surface of the vehicle, such as being mounted to locations along the hood, bumper, or side panels of the vehicle. These cables may be arranged so that when a tension is applied to the cables the vehicle's surface becomes more rigid. Likewise, when the tension is removed from the cables, the vehicle's surface becomes less rigid. The vehicle may use a computing system and sensors to collect data of the vehicle's surrounding and to automatically alter the rigidity of the vehicle's surface when a sensor detects that the vehicle is about to come into contact with another object.

For example, the vehicle's processor may control a mechanism that is capable of cutting, releasing, or loosening the tension cables in order to reduce the rigidity of the vehicle's surface and thereby reduce the amount of damage the vehicle may cause. The vehicle may also use one or more sensors to identify different types of surrounding objects and, in the event that the vehicle is going to collide with another object, predict the likely force of impact that will be generated by the collision. Based on the type of object and the likely force of the collision, the vehicle may selectively alter the rigidity of the vehicle's surface by altering the tension applied to one or more cables. For example, the vehicle may reduce tension to one or more cables if the vehicle is about to come into contract with a bicyclist or a pedestrian, while the vehicle may maintain tension to the cables if vehicle is about to contact another vehicle.

Tension members other than cables may also be used in accordance with aspects of the disclosure. For example, non-flexible tension members, such as rods, may be connected to a portion of a vehicle in a way that causes the rod to experience a tension. This tension is transferred to a vehicle's surface, so as to affect the rigidity of the surface. The tension member may be extended, broken, or disconnected from the vehicle's surface in order to reduce the force being applied by the tension member and thereby reduce the rigidity of the vehicle's surface. In addition, the vehicle's surface may be designed to allow for additional flexibility when the tension members are loosened. For example, the vehicle's surface may include multiple pieces that are flexible relative to one another when there is little or no tension applied to the tension members, but which are rigid relative to one another when a tension is applied to one or more of the tension members. The vehicle's surface may also be corrugated, so as to allow for increased flexibility, absent a tension from the tension member.

In another aspect, tension members may be incorporated into one or more pillars of the vehicle. For example, one or more of the vehicle's pillars may be constructed with a plurality of pillar sections that are movable with respect to one another. Each pillar section may be designed to allow a tension member, such as a cable, to run through it. A force may then be applied to the tension member running through pillar, so as to prevent the sections from moving with respect to one another. Upon detecting an impact with certain objects, the tension member may be cut or loosened, so as to allow the pillar sections to move with respect to one another and thereby reduce the rigidity of the pillar.

Example Systems

FIG. 1 shows a vehicle 100 in accordance with one aspect of the disclosure. As shown, various components of a perception system may be positioned on or in the vehicle 100 in order to detect external objects while the vehicle is being driven. In this regard, one or more sensors, such as laser range finders 20 may be positioned or mounted on the vehicle. As an example, the one or more computing devices (not shown) may control laser range finder 20, e.g., by rotating it 180 degrees. In addition, the perception system may include sensors in the form of one or more cameras 22 mounted internally on the windshield of vehicle 100 to receive and analyze various images about the environment. In addition to the laser range finder 20 and the one or more cameras 22 mounted internally on the windshield, other detection devices, such as sonar, radar, GPS, etc., may also be positioned in a similar manner. Vehicle 100 also includes various external surfaces, such as front bumper 10, rear bumper 11, hood 12, side panel 14, doors 16, and pillars 18. As described further below, the rigidity these surfaces may be altered by controlling one or more tension members of vehicle 100.

While certain aspects of the disclosure are particularly useful in connection with specific types of vehicles, the vehicle may be any type of vehicle including, but not limited to, cars, trucks, busses, boats, recreational vehicles, amusement park vehicles, farm equipment, trams, golf carts, trains, and trolleys. The vehicle may have one or more computing devices, such as computing device 110 containing one or more processors 120, memory 130 and other components typically present in general purpose computing devices. While vehicle 100 is shown as including features for an autonomous driving sub-systems, aspects of the disclosure may be used in connection with manually controlled vehicles.

Figure 2:
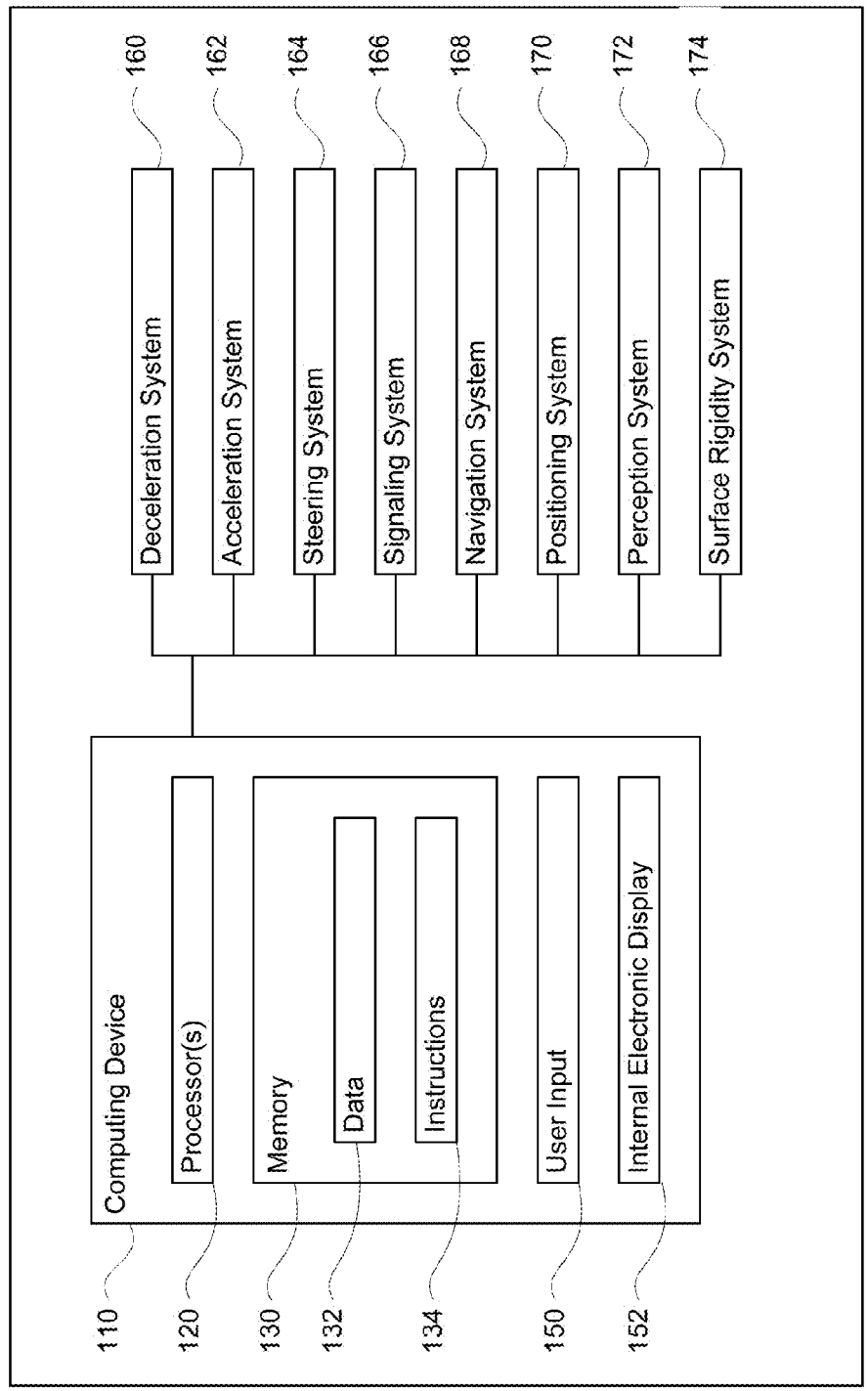
FIG. 2 is a functional diagram of a system in accordance with aspects of the disclosure.

FIG. 2 shows various sub-systems that may be used by vehicle 100. These sub-systems may be controlled or monitored by one or more computing devices, such as computing device 110. The memory 130 of computing device 110 stores information accessible by the one or more processors 120, including data 132 and instructions 134 that may be executed or otherwise used by the processor(s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 132 may be retrieved, stored or modified by processor(s) 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an ASIC or other hardware-based processor, such as a field programmable gate array (FPGA). Although FIG. 2 functionally illustrates the processor(s), memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above, as well as a user input 150 (e.g., a mouse, keyboard, touch screen and/or microphone) and various electronic displays (e.g., a monitor having a screen, a small LCD touch-screen or any other electrical device that is operable to display information). In this example, the vehicle includes an internal electronic display 152. In this regard, internal electronic display 152 may be located within a cabin of vehicle 100 and may be used by computing device 110 to provide information to passengers within the vehicle 100.

In one example, computing device 110 may be an autonomous driving computing system incorporated into vehicle 100. The autonomous driving computing system may capable of communicating with various components of the vehicle as needed in order to control the vehicle in fully autonomous (without input from a driver) as well as semi-autonomous (some input from a driver) driving modes. Vehicle 100 may have autonomous, semiautonomous, and manual (continuous input from a driver) driving modes. In this regard, vehicle 100 may include all of the features of a non-autonomous vehicle, for example: a steering apparatus, such as steering wheel; a navigation display apparatus, such as navigation display (which may be a part of electronic display); and a gear selector apparatus, such as gear shifter. The vehicle may also have various user input devices in addition to the foregoing, such as touch screen (again, which may be a part of electronic display), or button inputs, for activating or deactivating one or more autonomous driving modes and for enabling a driver or passenger to provide information, such as a navigation destination, to the computing device 110.

When engaged, computer 110 may control some or all of these functions of vehicle 100 and thus be fully or partially autonomous. It will be understood that although various systems and computing device 110 are shown within vehicle 100, these elements may be external to vehicle 100 or physically separated by large distances. In this regard, computing device 110 may be in communication various systems of vehicle 100, such as deceleration system 160, acceleration system 162, steering system 164, signaling system 166, navigation system 168, positioning system 170, perception system 172, and surface rigidity system 174, such that one or more systems working together may control the movement, speed, direction, and general operation of vehicle 100 in accordance with the instructions 134 stored in memory 130. Although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

Positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Perception system 172 also includes one or more components for detecting and performing analysis on objects external to the vehicle such as other vehicles, obstacles in the roadway, traffic signals, signs, trees, etc. For example, the perception system 172 may include lasers, sonar, radar, one or more cameras, or any other detection devices which record data which may be processed by computing device 110. In the case where the vehicle is a small passenger vehicle such as a car, the car may include a laser mounted on the roof or other convenient location as well as other sensors such as cameras, radars, sonars, and additional lasers. The computing device 110 may control the direction and speed of the vehicle by controlling various components. By way of example, if the vehicle is operating completely autonomously, computing device 110 may navigate the vehicle to a location using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine or by applying brakes by deceleration system 160), change direction (e.g., by turning the front or rear wheels of vehicle 100 by steering system 164), and signal such changes (e.g. by lighting turn signals of signaling system 166).

Perception system 172 may also be used by computing device 110 to determine if vehicle 100 is about to come into contact with another object. In response to a potential collision, computing device 110 may perform various actions. For example, if vehicle 100 is being manually controlled, computing device 110 may activate portions of signaling system 166 to alert the driver of vehicle 100 that a collision is likely to occur. Computing device 110 may also switch from a fully manual mode of operation to at least a partially autonomous mode of operation in order to avoid a potential collision or in order to reduce the damage caused by the collision. In determining that a collision is likely to occur, computing device 110 may also alter the rigidity of one or more surfaces of vehicle 100 using surface rigidity system 174. For example, if computing device 110 determines that vehicle 100 is about to come into contact with a pedestrian or an animal, computing device 110 may reduce the rigidity of one or more surfaces of vehicle 110.

Figure 3:
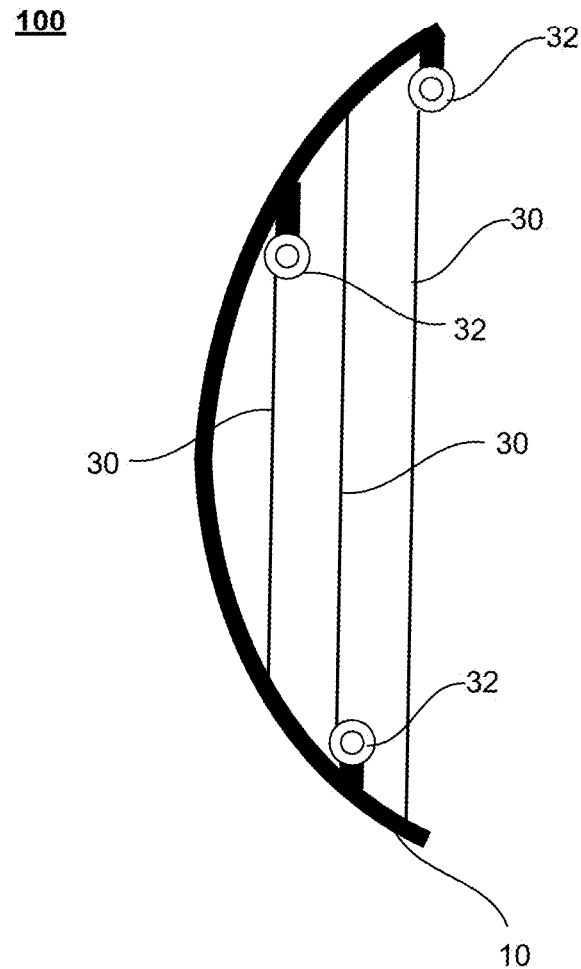
FIG. 3 is a cross-sectional view of a vehicle's bumper in accordance with aspects of the disclosure.

Returning to FIG. 1, vehicle 100 contains a variety of surfaces, such as front bumper 10, rear bumper 11, hood 12, side panel 14, doors 16, and pillars 18. Surface rigidity system 174 may alter the rigidity of these surfaces by altering a tension that is applied to various tension members. For example, FIG. 3 shows a cross-sectional view for a portion of bumper 10, as seen from a perspective looking down onto vehicle 100 from above. Attached to bumper 10 are cables 30 and winches 32. The each winch 32 may control the amount of tension that exists along a corresponding cable 30. Bumper 10 and cables 30 may be configured so that bumper 10 will have a higher rigidity when cables 30 are under tension, and will have a lower rigidity when cables 30 are under no tension or a reduced tension. In the lower rigidity state, bumper 10 may be more flexible or otherwise easier to deform compared to a higher rigidity state.

Figure 4:
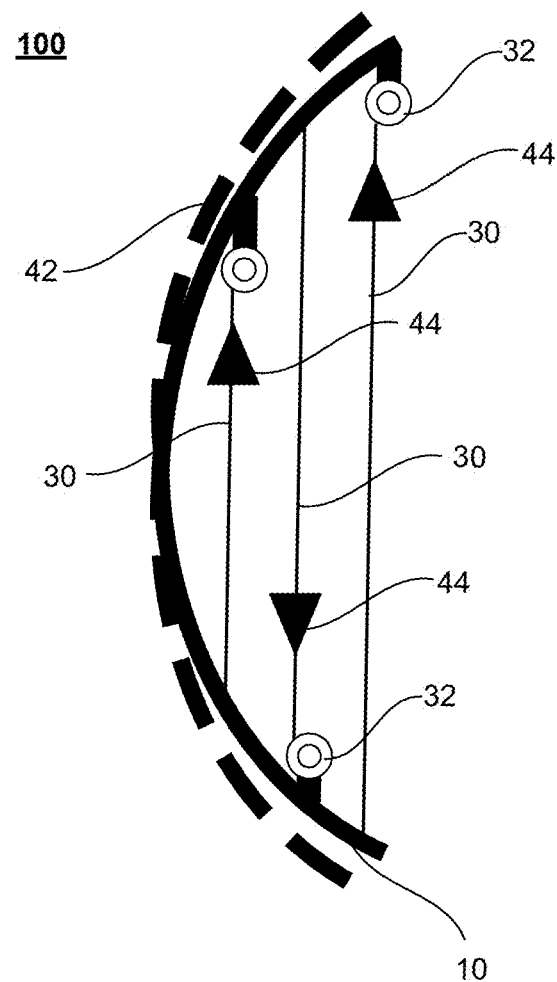
FIG. 4 is another cross-sectional view of a vehicle's bumper.

FIG. 4 shows an example of bumper 10 in which cables 30 are placed under tension by winches 32. The direction of the force applied by winches 32 to each cable 30 is indicated by an arrow 44. The tension being applied to cables 30 may cause the shape of bumper 10 to alter slightly. For example, dashed line 42 indicates the natural shape of bumper 10 when tension is not applied to cables 30. As the force applied to cables 30 is transferred to bumper 10, the surface of bumper 10 becomes stiffer. In this way, the rigidity of bumper 10 may be controlled by the amount of tension applied to cables 30.

While FIGS. 3 and 4 show cables 30 running along a particular cross-sectional plane of bumper 10, any number of tension members may be arranged within vehicle 100 along any number of cross-sectional planes. For example, cables 30 may be attached to bumper 10 so that cables 30 crisscross one another within vehicle 100. Cables 30 also need not be directly connected to bumper 10 in order for cable 30 to act as a tension member for bumper 10. For example, a cable 30 may act as a tension member for bumper 10 by being attached to one or more intermediate objects arranged so that the tension of cable 30 is transferred to bumper 10 through the one or more intermediate objects. In addition, while winches 32 are shown as being connected to bumper 10, winches 32 may be connected to another part of vehicle 100, such as by being connected to an interior frame (not shown) of vehicle 100. Cable 30 therefore need not be connected to bumper 10 at two locations in order for cable 30 to act as a tension member that is capable of altering the rigidity of bumper 10. Other tension controlling mechanisms may also be used in addition to, or in replacement of, winches 32 shown in FIGS. 3 and 4. For example, the tension of cables 30 may be controlled by linear actuators or levers. The tension on cables 30 may also be applied by pre-stretching cables 30 upon connecting cables 30 to a portion of vehicle 101.

Winches 32 may be controlled by computing device 110, so as to provide a predetermined tension to cables 30, and in turn, control the rigidity of bumper 10. While FIGS. 3 and 4 show each cable 30 being controlled by a single winch 32, a single cable may be arranged to run through a plurality of winches 32. In this way, a single cable 30, under the control of the plurality of winches, could be made to transfer a force to a bumper 10 at a plurality of points. In another example, a single winch 32 may be arranged to control a plurality of cables 30.

In another example, the tension on cables 30 may be controlled or altered by a tensioning mechanism other than winches 32. For example, in response to a likely collision, one or more cables 30 may be selectively broken or released in order to reduce the rigidity of a surface of vehicle 100. The breaking of a cable 30 may be performed in any number of ways, such as by cutting the cable or breaking the cable using, for example, pyrotechnics. While the altering of the tension on cables 30 may be controlled by computing device 110, the tension of cables 30 may also be altered in response to a trigger, such as a mechanical switch, that activates in response to a particular portion of vehicle 101 coming into contact with another object.

Figure 5:
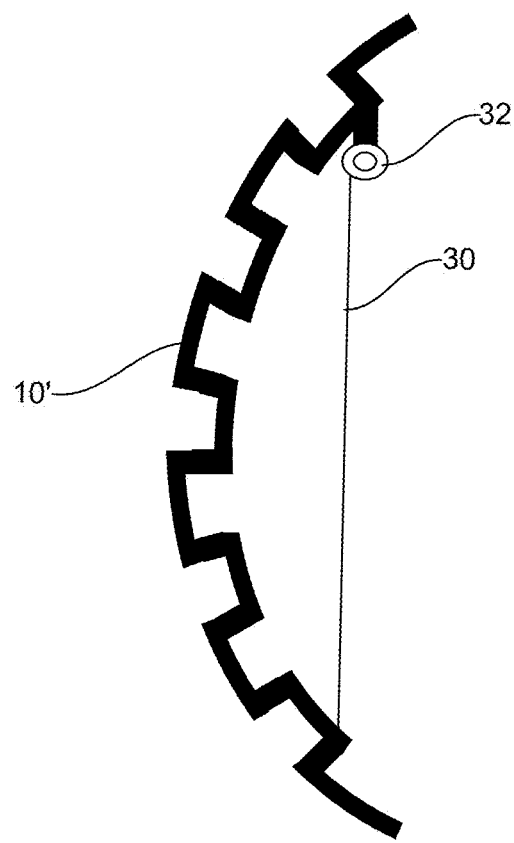
FIG. 5 is a cross-sectional view of a vehicle's bumper that has a corrugated surface.

The surfaces of vehicle 100 may be configured so as to allow for a desired rigidity of the surface while the surface is in both a high rigidity state and a low rigidity state. FIG. 5 shows an example of a bumper 10' of vehicle 100 having a corrugated surface. The corrugated surface may allow for additional flexibility when cable 30 is under no tension or a low tension. Tension members, such as cables 30 shown in FIGS. 3-5, may be used to control the rigidity of any number of vehicle surfaces, including front bumper 10, rear bumper 11, hood 12, side panel 14, doors 16, and pillars 18. These surfaces of vehicle 100 may be constructed of any number of materials, such as plastics, metals, or composites.

Figure 6:
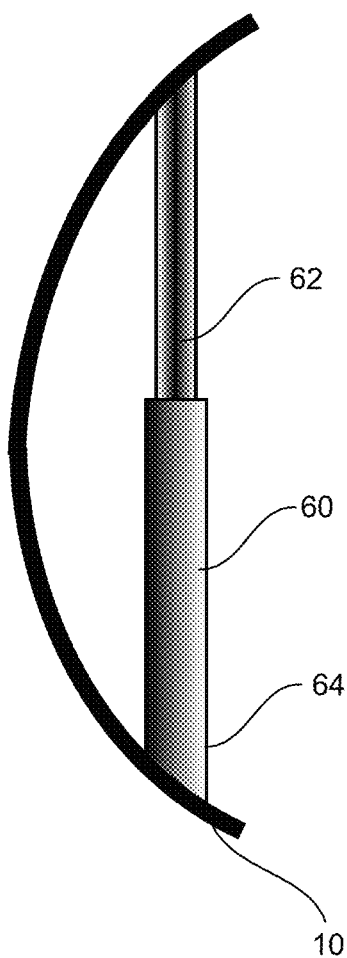
FIG. 6 is cross-sectional view of another example of a vehicle's bumper in accordance with aspects of the disclosure.

The tension members used to control the rigidity of a vehicles surface need not be cables. For example, one or more rods may be used as tension members, in that the rods may be arranged relative to a vehicle's surface so as to apply a force on the vehicle's surface in a manner that will increase the surface's rigidity. The rod may then be released, broken, or otherwise altered, under the control of a computing device, in order to reduce the rigidity of the vehicle's surface. FIG. 6 shows an example of rod 60 acting as a tension member for bumper 10. Rod 60 is made of two segments 62 and 64 that may move relative to one another along the length of their axes. By controlling the relative position of segments 62 and 64, computing device 110 (not shown), may control the amount of force applied by rod 60 to bumper 10, and may in turn control the rigidity of bumper 10.

Figure 7:
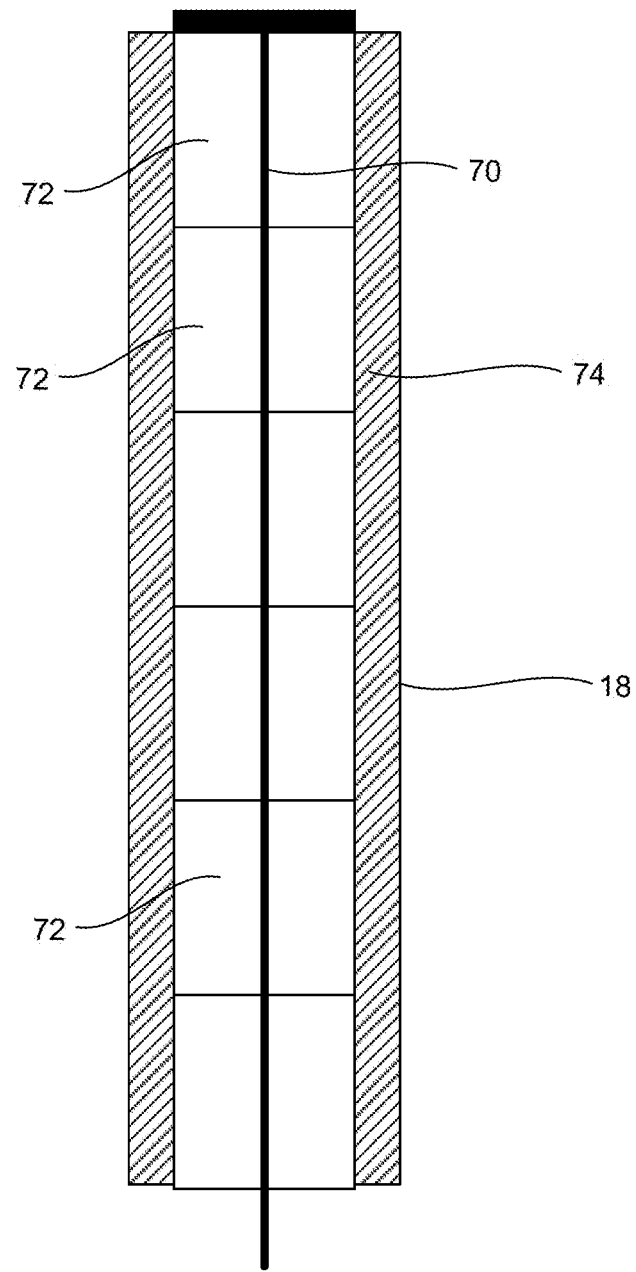
FIG. 7 is a cross-sectional view of a vehicle's a-pillar in accordance with aspects of the disclosure.

Tension members may also be used to control the rigidity of pillars 18 of FIG. 1. For example, FIG. 7 shows a cross-section of pillar 18 of vehicle 100 in which a cable 70 acts as a tension member. Pillar 18 includes a plurality of load bearing blocks 72, a flexible tubing 74 that surrounds blocks 72, and a cable 70 that runs through the middle of blocks 72. A tension may be applied to cable 70. When there is no tension on cable 70, each block 72 is movable relative to one another, subject to the constraint of flexible tubing 74. However, when a tension is applied to cable 70, the force of that tension is transferred from cable 70 to blocks 72, thereby causing blocks 72 to be fixed in place relative to one another, and causing pillar 18 to be in a high rigidity state. As discussed above, cable 70 may be cut, broken, or loosened in order to allow blocks 72 to move relative to one another, thereby putting pillar 18 in a reduced rigidity state.

Figure 8:
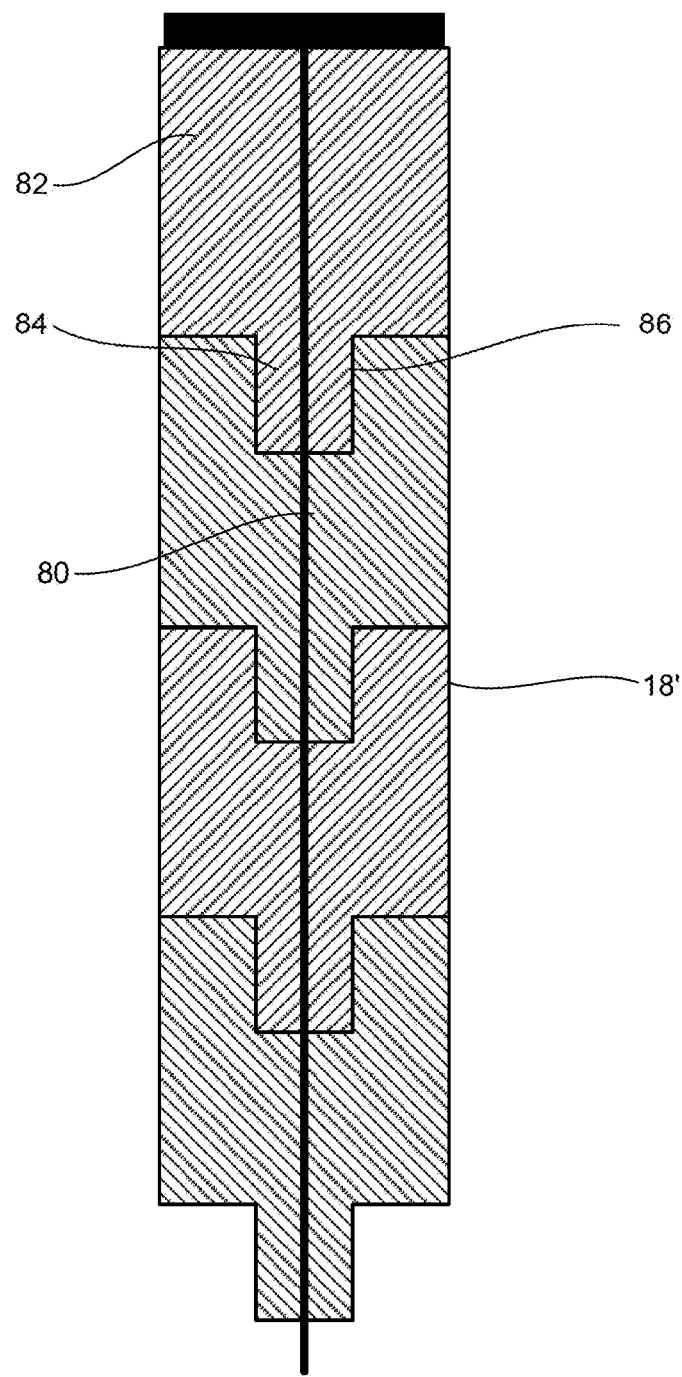
FIG. 8 is a cross-sectional view of another example of a vehicle's a-pillar in accordance with aspects of the disclosure.

FIG. 8 shows a cross-section of a pillar 18' that includes load bearing blocks 82 and cable 80. Blocks 82 may be designed to allow the blocks to interconnect with one another. For example, each block of pillar 18' includes an extending portion 84 on one side and a receiving portion 86 on the other side. The extending portion 84 of one block 82 may interconnect with the receiving portion 86 of another block 82. The interconnections between blocks 82 may be configured so that when cable 80 is not under tension, blocks 82 may slide out of there interconnections with one another, when subject to an external force. However, when cable 80 is under sufficient tension, blocks 82 are held in a fixed position relative to one another. The rigidity of pillar 18' may therefore be altered by controlling the tension of cable 80.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Returning to FIG. 2, the vehicle's computing device 110 may use received sensor data to identify information about specific objects, such as the position and movement of objects that are in the vehicle's surroundings. Computing device 110 may also classify particular objects by comparing the collected sensor data from perception system 172 with stored object classification data 132. For example, by comparing the sensor data collected by perception system 172 with object classification data 132, the vehicle's computing device 110 may determine that a first detected object is an automobile and that a second detected object is a pedestrian.

As the sensors collect data over time, the sensor data may identify location information for the objects and how that location information changes over time. For example, because vehicle 100's sensors may detect the movements of vehicle 610 over time, the perception system 172 may provide the vehicle's computing device 110 with information about how the characteristics of vehicle 610 may have changed over time, including, for example, changes in heading, location, speed, etc. Based on this information, computing device 110 may determine whether a collision between vehicle 100 and a detected object is likely.

Figure 9:
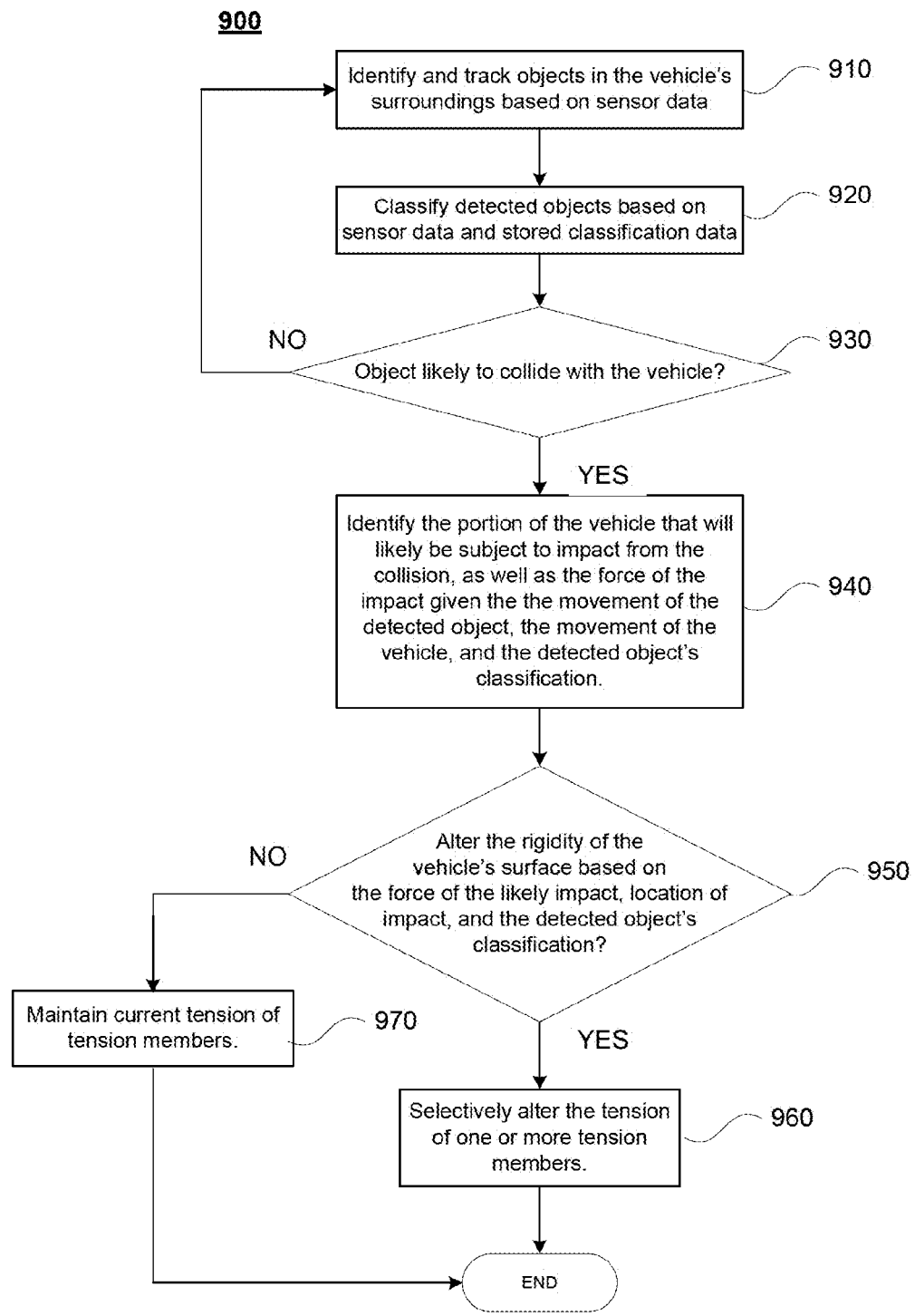
FIG. 9 is an example flow diagram in accordance with aspects of the disclosure.

FIG. 9 is an example flow diagram 900 which depicts some of the aspects described above which may be performed by one or more computing devices such as one or more computing devices 110 of vehicle 100. In this example, sensor data corresponding to objects in a first vehicle's environment is received at block 910. The sensor data includes location information for the objects over time, as well as data relating to each object's appearance, including information relating to shape, size, etc. At block 930, the detected objects are classified based on the collected sensor data. Several levels of classification may be used. For example, a first object may be classified as a mobile automobile. The first object may be further classified as a compact car or a car of a particular make and model. A second object may be classified as a pedestrian, and may be further classified as a child. Immobile objects, such as trees, buildings, and telephone poles may also be classified.

At block 930, it may be determined whether a detected object is likely to collide with vehicle 100. This determination may be made by analyzing object data that tracks the movement and location of the detected object relative to vehicle 100. If a determination is made that an object is likely to collide with vehicle 100, the nature of the collision is identified at block 940. For example, the portion of vehicle 100 that is likely to come into contact with the object may be identified, along with the likely force of impact. The likely force of impact may be determined based on collected object data, such as the object's speed and classification, as well as the portion of vehicle 100 that is likely to come into contact with the object.

At block 950, a determination may be made whether the rigidity of one or more surfaces of vehicle 100 should be altered. This determination may be made by accessing behavior model data for vehicle 100, in which the behavior model identifies circumstances in which the rigidity of the vehicle's surface should be altered. The circumstances may be based on various factors, such as the likely force of impact, the portion of vehicle 100 that will come into contact with the detected object, and the classification of the detected object. For example, a determination may be made to alter the rigidity of the vehicle's surface if the object involved in the collision is a pedestrian or bicyclist, but not if the object is a truck. If a determination is made to alter the rigidity of the vehicle's surface, the tension may be selectively altered for one or more tension members at block 960. For example, if it is determined that a bicyclist is about to strike the hood and front bumper of the vehicle, the tension may be reduced for the tension members associated with the hood and front bumper, so as to reduce the rigidity of those surfaces. If the factors relating to the collision, such as object classification and force of impact, do not meet predefined requirements or thresholds, the tension on the tension members may be maintained at block 970.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for altering a vehicle's rigidity, the method comprising:
    detecting an object in a vehicle's surroundings;
    determining, by one or more processors, that the object and the vehicle will collide; and
    altering, by the one or more processors, a tension in one or more tension members to alter a rigidity of a portion of the vehicle based on the determination that the object and the vehicle will collide.

2. The method of claim 1, wherein the one or more tension members are cables.

3. The method of claim 1, wherein altering the tension in the one or more tension members comprises reducing the tension by one of cutting, releasing, or loosening the one or more tension members.

4. The method of claim 1, wherein the one or more tension members are arranged with respect to a surface of the vehicle so that a reduction of tension in the one or more tension members reduces rigidity of the surface.

5. The method of claim 4, wherein the surface is at least one of a hood, bumper, or panel of the vehicle.

6. The method of claim 4, wherein at least a portion of the surface is corrugated.

7. The method of claim 1, wherein the one or more tension members are arranged with respect to a pillar of the vehicle so that reduction of tension in the one or more tension members reduces rigidity of the pillar.

8. The method of claim 7, wherein the pillar comprises a plurality of sections, and wherein a sufficient tension within the one or more tension members prevents the plurality of sections from moving relative to one another.

9. The method of claim 1, wherein detecting the object further comprises classifying the object, and wherein altering the tension in the one or more tension members is based, at least in part, on a classification of the object.

10. The method of claim 9, wherein the classification of the object is one of a bicyclist, pedestrian, or animal.

11. A system for altering a rigidity of a vehicle, the system comprising:
    one or more sensors to detect an object in a vehicle's surroundings;
    one or more computing devices having one or more processors configured to:
        determine that the object and the vehicle will collide; and
        alter a tension in one or more tension members to alter a rigidity of a portion of the vehicle, based on the determination that the object and the vehicle will collide.

12. The system of claim 11, wherein the one or more tension members are cables.

13. The system of claim 11, wherein altering the tension in the one or more tension members comprises reducing the tension by one of cutting, releasing, or loosening the one or more tension members.

14. The system of claim 11, wherein the one or more tension members are arranged with respect to a surface of the vehicle so that a reduction of tension in the one or more tension members reduces rigidity of the surface.

15. The system of claim 14, wherein the surface is at least one of a hood, bumper, or panel of the vehicle.

16. The system of claim 14, wherein at least a portion of the surface is corrugated.

17. The system of claim 11, wherein the one or more tension members are arranged with respect to a pillar of the vehicle so that reduction of tension in the one or more tension members reduces rigidity of the pillar.

18. The system of claim 17, wherein the pillar comprises a plurality of sections, and wherein a sufficient tension within the one or more tension members prevents the plurality of sections from moving relative to one another.

19. The system of claim 11, wherein detecting the object further comprises classifying the object, and wherein altering the tension in the one or more tension members is based, at least in part, on a classification of the object.

20. The system of claim 11, wherein the one or more processors are further configured to determine a likely impact between the vehicle and the object, and wherein altering the tension in the one or more tension members is based, at least in part, on the likely impact.

* * * * *